(12) United States Patent
Yamanaka

(10) Patent No.: US 8,724,234 B2
(45) Date of Patent: May 13, 2014

(54) FISHEYE ZOOM LENS BARREL HAVING MARKS ON ZOOM OPERATION RING

(75) Inventor: Takumi Yamanaka, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 271 days.

(21) Appl. No.: 13/183,086

(22) Filed: Jul. 14, 2011

(65) Prior Publication Data

US 2012/0013997 A1    Jan. 19, 2012

(30) Foreign Application Priority Data

Jul. 14, 2010   (JP) .................................. 2010-159313

(51) Int. Cl.
  *G02B 15/14*   (2006.01)
  *G02B 7/10*    (2006.01)

(52) U.S. Cl.
  CPC ...................................... *G02B 7/10* (2013.01)
  USPC ......................................... 359/701; 359/702

(58) Field of Classification Search
  USPC ................................................. 359/701, 702
  See application file for complete search history.

(56) References Cited

U.S. PATENT DOCUMENTS

2004/0042095 A1    3/2004   Nomura

FOREIGN PATENT DOCUMENTS

| CN | 1485677 A | 3/2004 |
| CN | 2690904 Y | 4/2005 |
| JP | 4-130917 U | 12/1992 |
| JP | 2007-033504 A | 2/2007 |

OTHER PUBLICATIONS

Chinese office action in Chinese counterpart application No. CN201110192312.3, dated Jun. 9, 2013. English translation provided.

*Primary Examiner* — Jack Dinh
(74) *Attorney, Agent, or Firm* — Rossi, Kimms & McDowell LLP

(57) ABSTRACT

A zoom lens barrel includes a fixed barrel in which a first mark is indicated, and a zoom operation ring in which a second mark is indicated, the zoom operation ring being supported on the fixed barrel. The zoom lens barrel has a focal length region where at least angles of view of a circular fisheye and a full-frame fisheye can be formed, and one of the angles of view of the circular fisheye and the full-frame fisheye is formed for a predetermined image-pickup element size in a focal length where the first mark and the second mark are matched to each other.

17 Claims, 9 Drawing Sheets

FOCAL LENGTH 8.5 mm
MINIMUM FOCAL
LENGTH END

FOCAL LENGTH 9.5 mm
INTERMEDIATE FOCAL
LENGTH END

FOCAL LENGTH 12 mm
INTERMEDIATE FOCAL
LENGTH END

FOCAL LENGTH 15 mm
MAXIMUM FOCAL
LENGTH END

FOCAL LENGTH
5 mm
MINIMUM
FOCAL LENGTH
END

FOCAL LENGTH
6.3 mm
INTERMEDIATE
FOCAL LENGTH
END

FOCAL LENGTH
8.5 mm
INTERMEDIATE
FOCAL LENGTH
END

FOCAL LENGTH
9.5 mm
INTERMEDIATE
FOCAL LENGTH
END

FOCAL LENGTH 12 mm
INTERMEDIATE FOCAL
LENGTH END

FOCAL LENGTH 15 mm
MAXIMUM FOCAL
LENGTH END

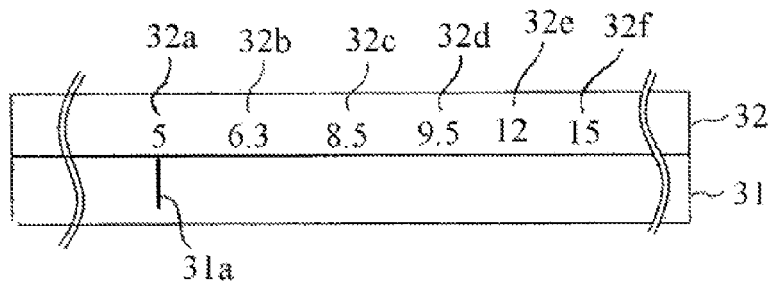
FIG. 5A
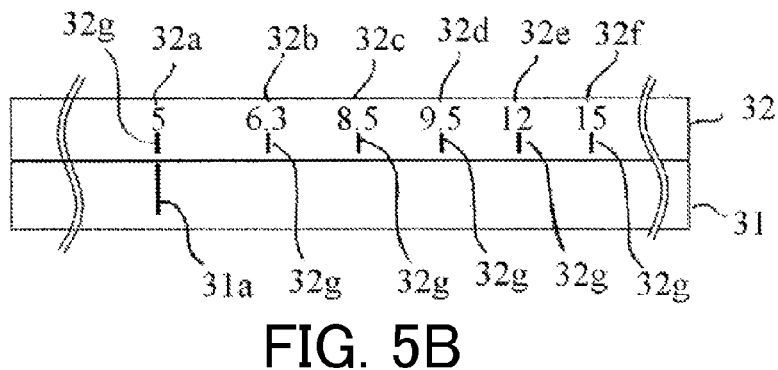
FIG. 5B
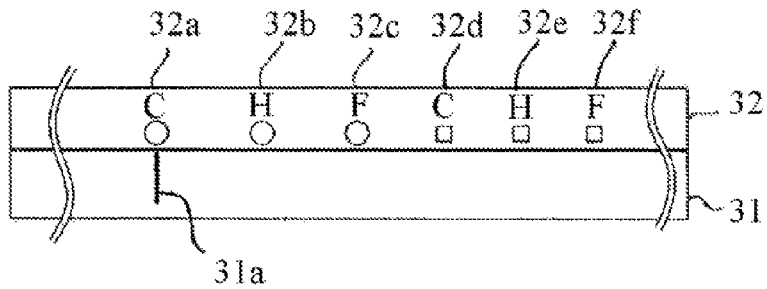
FIG. 5C
| | FOCAL LENGTH | PREDETERMINED IMAGE-PICKUP ELEMENT | IMAGE-PICKUP ELEMENT SIZE SIGN | ANGLE OF VIEW | ANGLE OF VIEW SIGN |
|---|---|---|---|---|---|
| 32a | 5 mm | APS-C | C | CIRCULAR FISHEYE | ○ |
| 32b | 6.3 mm | APS-H | H | CIRCULAR FISHEYE | ○ |
| 32c | 8.5 mm | FULL SIZE | F | CIRCULAR FISHEYE | ○ |
| 32d | 9.5 mm | APS-C | C | FULL-FRAME FISHEYE | □ |
| 32e | 12 mm | APS-H | H | FULL-FRAME FISHEYE | □ |
| 32f | 15 mm | FULL SIZE | F | FULL-FRAME FISHEYE | □ |
FIG. 5D

FISHEYE ZOOM LENS BARREL HAVING MARKS ON ZOOM OPERATION RING

BACKGROUND OF THE INVENTION

1. Field of the Invention

The present invention relates to a zoom lens barrel having marks on a zoom operation ring of a fisheye zoom lens barrel.

2. Description of the Related Art

In recent years, a digital single-lens reflex camera using a photoelectric conversion element (image-pickup element) is actively a commercial reality. In a screen size of an image-pickup element of the digital single-lens reflex camera, a Full Size which is the same size as a silver salt film 24×36 mm and an APS-C size or an APS-H size which is a smaller image-pickup surface than the Full Size become mainstreams.

In addition, there is a fisheye zoom lens including both angles of view forming a circular fisheye and a full-frame fisheye for a Full Size image-pickup element.

This fisheye zoom lens, in the digital single-lens reflex camera including the APS-C size or the APS-H size image-pickup element, can obtain an angle of view of the full-frame fisheye in the focal length range. Here, the following will assume a specification where the circular fisheye for the Full Size image-pickup element is formed at a shortest focal length and the full-frame fisheye for the Full Size image-pickup element is formed at a longest focal length. In this case, a user can easily set a focal length forming the circular fisheye or the full-frame fisheye by controlling a zoom operation ring of this fisheye zoom lens barrel to each end. In addition, when zooming from the circular fisheye to the full-frame fisheye in the fisheye zoom lens barrel, since the terms "wide-angle end" and "telephoto end" are not appropriate in a zoom position, this description uses the terms "shortest focal length side or shortest focal length" and "longest focal length side or longest focal length".

When this fisheye zoom lens barrel is mounted on a camera including the APS-C size or APS-H size image-pickup element, an angle of view of the full-frame fisheye is formed in midstream of a zoom movable range, but it cannot determine what position the zoom operation ring should be set in to obtain the angle of view of the full-frame fisheye. Furthermore, if the zoom operation ring is set at a focal length position where the full-frame fish eye is formed for the predetermined image-pickup element size, it requires positioning the zoom operation ring again when the zoom operation ring is carelessly rotated.

Japanese Utility Model Laid-Open No. 4-130917 discloses a method that provides an appropriate number of a click mechanism temporarily retaining a variable magnification ring at a position of a specific magnification and a magnification indication.

Moreover, Japanese Patent Laid-Open No. 2007-033504 discloses a method that performs lock retention of the zoom operation ring for a lens barrel body.

However, a conventional art disclosed in Japanese Utility Model Laid-Open No. 4-130917 has efficacy for indicating an object distance and a temporary magnification, but does not indicate to a user a focal length forming the circular fisheye or the full-frame fisheye when mounting the zoom lens barrel on cameras including image-pickup element sizes different from each other.

Moreover, a conventional art disclosed in Japanese Patent Laid-Open No. 2007-033504 can lock only in a state where the lens barrel is shortest, and does not have efficacy when a plurality of lock positions is required.

SUMMARY OF THE INVENTION

First, the present invention provides a zoom lens barrel where a user can easily set a focal length forming a circular fisheye or a full-frame fisheye when the zoom lens barrel is mounted on cameras including image-pickup element sizes different from each other.

Second, the present invention provides a zoom lens barrel where a zoom operation ring is not carelessly rotated when setting the zoom operation ring to a focal length forming the circular fisheye or the full-frame fisheye for a predetermined image-pickup element size.

A zoom lens barrel as one aspect of the present invention includes a fixed barrel in which a first mark is indicated, and a zoom operation ring in which a second mark is indicated, the zoom operation ring being supported on the fixed barrel. The zoom lens barrel has a focal length region where at least angles of view of a circular fisheye and a full-frame fisheye can be formed, and one of the angles of view of the circular fisheye and the full-frame fisheye is formed for a predetermined image-pickup element size in a focal length where the first mark and the second mark are matched to each other.

A zoom lens barrel as another aspect of the present invention includes a fixed barrel, a zoom operation ring supported on the fixed barrel, and a lock holding unit configured to hold the zoom operation ring for the fixed barrel. The zoom lens barrel includes a focal length region where at least angles of view of a circular fisheye and a full-frame fisheye can be formed, the zoom operation ring includes an engagement portion for engaging with the lock holding unit, and a lock position for the fixed barrel of the zoom operation ring is a focal length where one of the angles of view of the circular fisheye and the full-frame fisheye is formed for a predetermined image-pickup element size.

Further features and aspects of the present invention will become apparent from the following description of exemplary embodiments with reference to the attached drawings.

BRIEF DESCRIPTION OF THE DRAWINGS

FIGS. 5A to 5D are external development views of a zoom lens barrel in embodiment 3.

DESCRIPTION OF THE EMBODIMENTS

Exemplary embodiments of the present invention will hereinafter be described with reference to the accompanying drawings.

Embodiment 1

A zoom lens barrel in embodiment 1 of the present invention will hereinafter be described with reference to FIGS. 1, 2A to 2D and 8. The zoom lens barrel of the present invention is attachable to cameras including image-pickup elements of varied sizes.

Figure 1:
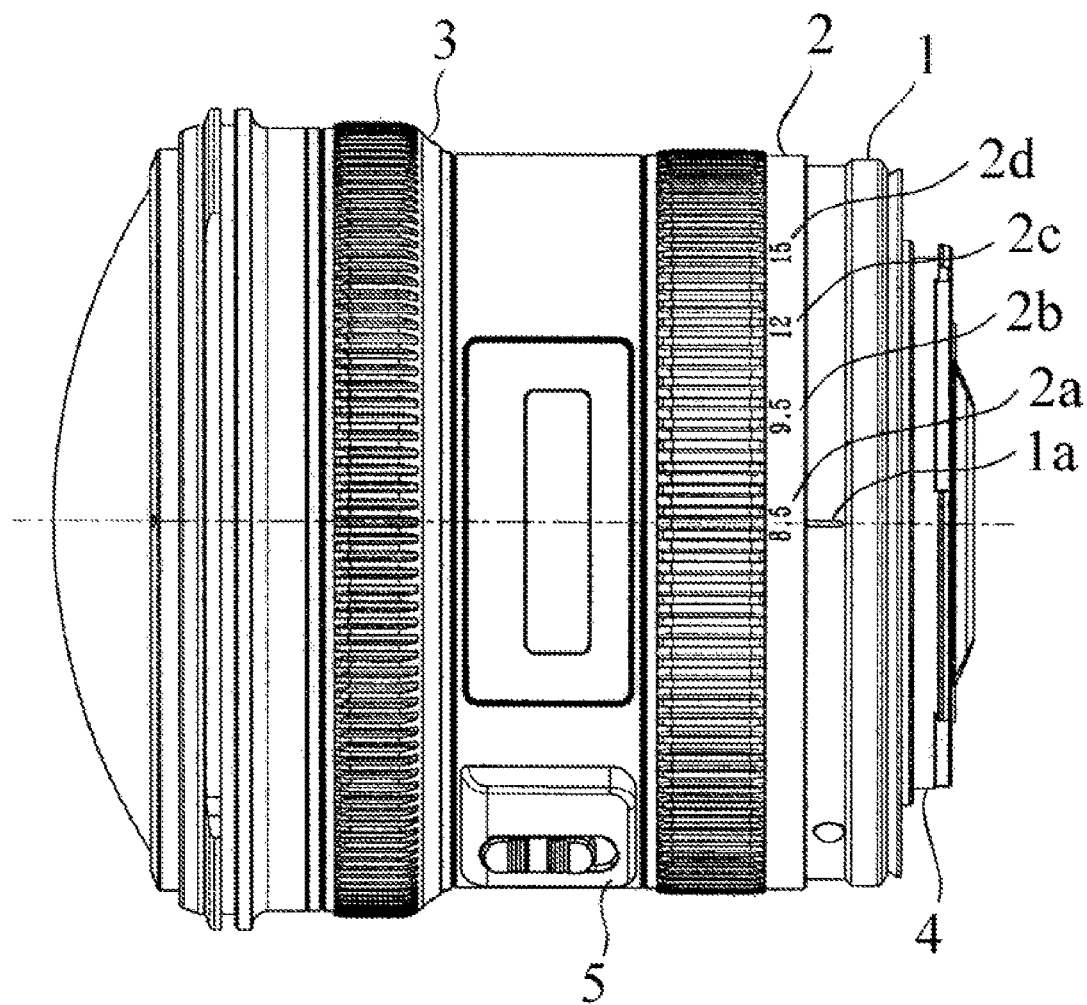
FIG. 1 is an external view of a zoom lens barrel in embodiment 1.

FIG. 1 is an external view of a zoom lens barrel at a shortest focal length state in embodiment 1 of the present invention.

FIGS. 2A to 2D are diagrams illustrating a relationship between an image-pickup element and an image circle of the zoom lens barrel in embodiment 1.

Figure 8:
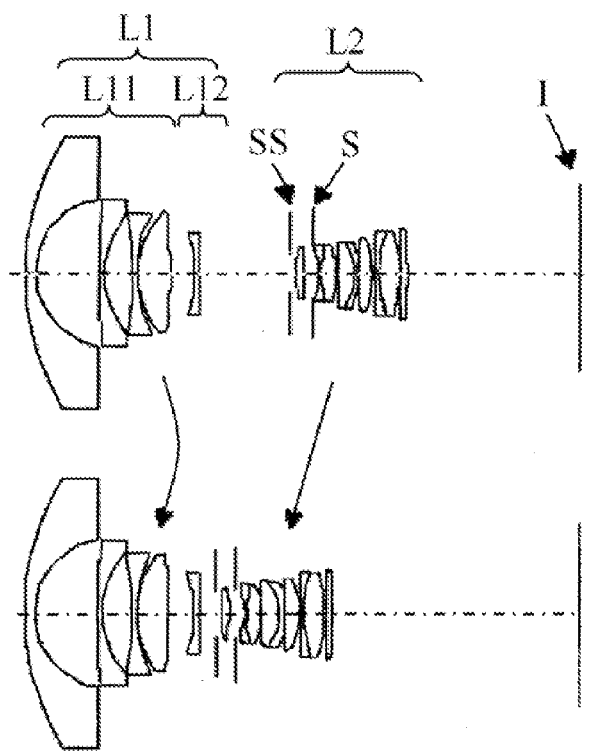
FIG. 8 is a diagram illustrating a lens configuration at a shortest focal length and a longest focal length in a zoom lens barrel in embodiment 5 and a trajectory of the lens configuration.

FIG. 8 is a diagram illustrating a lens configuration at a shortest focal length and a longest focal length in the zoom lens barrel in embodiment 1 and a trajectory of the lens configuration.

In FIG. 1, reference numeral 1 denotes a fixed barrel, and reference numeral 2 denotes a zoom operation ring rotatably hold on the fixed barrel. Due to a rotate operation of the zoom operation ring 2, magnification-varying lens units L1 and L2 illustrated in FIG. 8 moves on an optical axis to vary a focal distance. A reference numeral 3 denotes a focus operation ring. A reference numeral 4 denotes a mount member, and has a Bayonet shape for attaching to a camera body not shown. A reference numeral 5 denotes a switch member for switching an operation of AF/MF.

On the fixed barrel 1, a first mark 1a is printed. Moreover, a focal length value 2a at a shortest focus length, focal length values 2b and 2c of an intermediate focal length, and a focal length value 2d at a longest focal length are printed (second mark).

As illustrated in FIG. 8, a fisheye zoom lens system of the present invention is configured from the first lens unit L1 having a negative power and the second lens unit having a positive power, the first and second lens units L1 and L2 being separated in a position where an air space is maximum at the shortest focal length. In a case of varying a magnification, when the first lens unit L1 is moved from the shortest focal length toward an image surface side and then is moved toward the object side, the second lens unit L2 is moved toward the object side so that an interval between the first lens unit L1 and the second lens unit L2 is monotonously reduced. These operations provide a maximum image height having a size different between the shortest focal length state and the longest focal length state. When the above magnification-varying operation is fixed at the shortest focal length, the present invention can be used as a circular fisheye of a single focus in a Full Size screen. Similarly, by fixing the magnification-varying operation in an arbitrary position, the present invention can be also used as a full-frame fisheye of a single focus in APS-C, APS-H, and Full Size.

The four main types of projection method of fisheye lenses are:

i) Equisolid Angle Projection Y=2f sin(θ/2)
ii) Equidistance Projection Y=fθ
iii) Orthogonal Projection Y=f sin θ
iv) Sterographic Projection Y=2 f tan(θ/2)

Figure 11:
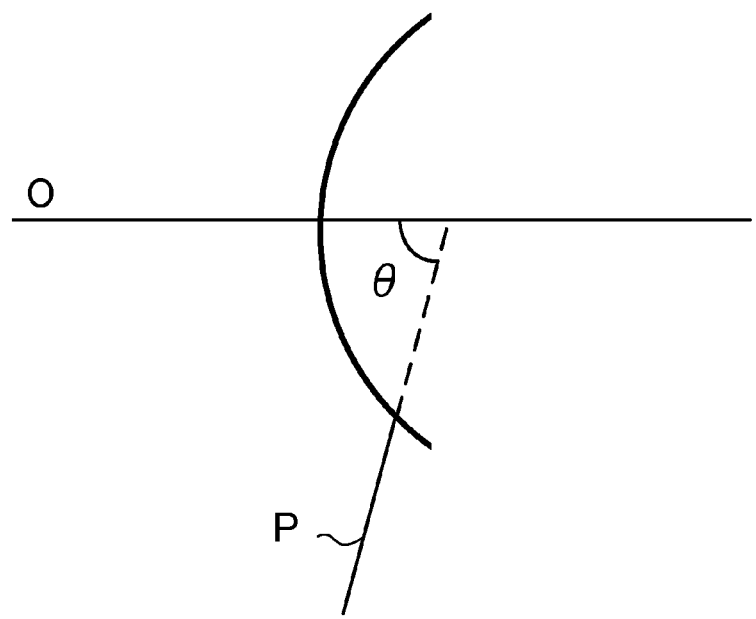
FIG. 11 is a diagram illustrating an angle θ where, in a lens closest to an object, an optical axis and a principal ray of an off-axis light flux cross.

The f denotes an arbitrary focal length satisfying the shortest focal length fw≤f≤the longest focal length ft in the fisheye lens, the θ denotes an angle between an optical axis and a principal light ray of an off-axis light flux entering a lens surface closest to the object in the fisheye lens (in first lens unit L1), and y denotes an image height formed when the focal length is f. As illustrated in FIG. 11, the angle θ is an angle between the optical axis o and an extension wire where a principal light ray P of the off-axis light flux entering the lens surface closest to the object is linearly extended in the lens.

In the present invention, the fisheye zoom lens satisfies the following conditional expression.

The following conditional expression (1) defines a maximum image height Yw at the shortest focal length and a maximum image height Yt at the longest focal length in the fisheye zoom lens of the present invention.

$$1.70 \leq Yt/Yw \leq 2.5$$

$$Y=2 \times f \times \sin(\theta/2)(85° \leq \theta \leq 90°) \quad (1)$$

When exceeding the upper limit of the conditional expression (1), since a move amount of each unit when varying the magnification or a refractive power of each unit need to increase, a variation in the magnification variation in all aberrations increases. When exceeding the lower limit of the conditional expression (1), it becomes difficult to configure a zoom lens including from the circular fisheye to the full-frame fisheye.

The conditional expression (1) may further satisfy the following conditional expression (1A):

$$1.80 \leq Yt/Yw \leq 2.2$$

$$\text{where } Y=2 \times f \times \sin(\theta/2)(85° \leq \theta \leq 90°) \quad (1A)$$

A screen size is often an aspect ratio 2:3. Accordingly, at least, the conditional expression (1) requires 1.8 or more to be contained from the circular fisheye to the full-frame fisheye into the screen size having the ratio.

The following conditional expression (2) defines a back focus and a focal length of the first lens unit at the shortest focal length.

$$3.45 \leq bf\_wide/|f1| \leq 7 \quad (2)$$

When exceeding the upper limit of the conditional expression (2), the focal length of the first lens unit so shortens, and as a result it becomes difficult to correct a field curvature, a chromatic aberration of magnification and a distortion. When exceeding the lower limit of the conditional expression (2), the focal length of the first lens unit so lengthens, and as a result it becomes difficult to realize the circular fisheye at the shortest focal length. Moreover, the back focus shortens, and it becomes difficult to make secure of a mechanical space.

The above conditional expression (2) may further satisfy the following conditional expression (2A):

$$3.55 \leq bf\_wide/|f1| \leq 5 \quad (2A)$$

The following conditional expression (3) defines a negative meniscus lens located in a position closest to the object in the first lens unit.

$$0.4 \leq SF1 \leq 1.0$$

$$SF1=(r1-r2)/(r1+r2) \quad (3)$$

The r1 denotes a radius of curvature of the negative meniscus lens in the object side, r2 denotes a radius of curvature in the image side, and SF1 denotes a shape factor.

A lens where the upper limit of the conditional expression (3) is exceeded is not a meniscus lens, and a light ray where an angle of view is about 180 degree cannot be taken. When exceeding the lower limit of the conditional expression (3), a refractive power of the lens weakens and a generated amount of a distortion is reduced, and it becomes to accomplish the angle of view 180 degree as a fisheye lens.

The above conditional expression (3) may further satisfy the following conditional expression (3A).

$$0.50 \leq SF1 \leq 0.75$$

$$SF1=(r1-r2)/(r1+r2) \quad (3A)$$

The following conditional expression (4) represents a conditional expression defining a refractive index n_G1 of the negative meniscus lens located in a position closest to the object in the first lens unit.

$$1.75 \leq n\_G1 \leq 2.0 \quad (4)$$

A glass material exceeded over the upper limit of the conditional expression (4) has a low transmittance in a short wavelength side and a off-color balance. When exceeding the lower limit of the conditional expression (4), a refractive power of the lens weakens and a generated amount of the distortion is reduced, and it becomes to accomplish the angle of view about 180 degree as a fisheye lens.

The above conditional expression (4) may further satisfy the following conditional expression (4A).

$$1.80 \leq n\_G1 \leq 1.90 \quad (4A)$$

The following conditional expression (5) relates to a partial dispersion ratio of one or more negative lenses closer to the image side than the negative meniscus lens, which is closest to the object side in the first lens unit.

$$\theta g, F-(-0.001682 \cdot vd+0.6438) \geq 0.01 \quad (5)$$

The θg, F denotes the partial dispersion ratio of the negative meniscus lens, and the vd denotes an Abbe number.

Since it becomes difficult to correct a chromatic aberration of magnification when exceeding the lower limit of the conditional expression (5), the value satisfying the conditional expression (5) may be adopted.

The conditional expression (5) may further satisfy the following conditional expression (5A).

$$\theta g, F-(-0.001682 \cdot vd+0.6438) \geq 0.018 \quad (5A)$$

The following conditional expression (6) relates to a partial dispersion ratio of one or more positive lenses (convex lens) in the second lens unit.

$$\theta g, F-(-0.001682 \cdot vd+0.6438) \geq 0.01 \quad (6)$$

Since it becomes difficult to correct an axial chromatic aberration and a chromatic aberration of magnification when exceeding the lower limit of the conditional expression (6), the value may be satisfied the conditional expression (6).

The conditional expression (6) may further satisfy the following conditional expression (6A)

$$\theta g, F-(-0.001682 \cdot vd+0.6438) \geq 0.018 \quad (6A)$$

The conditional expression (7) defines a move amount of the second lens unit when varying the magnification and a focal length of the second lens unit.

$$0.55 \leq m2/f2 \leq 0.8 \quad (7)$$

The m2 denotes a move amount where the second lens unit moves in the object side when varying the magnification from the shortest focal length to the longest focal length, and f2 denotes the focal length of the second lens unit.

When exceeding the upper limit of the conditional expression (7), the move amount increases, or the focal length of the second lens unit shortens and the aberration variation when varying the magnification increases. When exceeding the lower limit of conditional expression (7), the move amount decreases, or the focal length of the second lens unit lengthen and it becomes difficult to secure a desired magnification-varying ratio.

The conditional expression (7) may further satisfy the conditional expression (7A).

$$0.60 \leq m2/f2 \leq 0.75 \quad (7A)$$

The following conditional expression (8) defines a ratio between focal lengths of the first lens unit and the second lens unit.

$$0.2 \leq |f1|/f2 \leq 0.42 \quad (8)$$

When exceeding the upper limit of the conditional expression (8), the focal length of the first lens unit lengthens, and it becomes difficult to realize the circular fisheye at the shortest focal length. When exceeding the lower limit of the conditional expression (8), the focal length of the first lens unit shortens, and it becomes difficult to correct a field curvature and a chromatic aberration of magnification.

The conditional expression (8) may further satisfy the following conditional expression (8A).

$$0.30 \leq |f1|/f2 \leq 0.42 \quad (8A)$$

The present invention moves a part (L12) of the first lens unit L1 in an optical axis direction at the time of a focusing. Most of fisheye lenses are usually a full feeding method or a part feeding method, in which an inner focus may be performed to quickly perform an autofocus. Moreover, since the fisheye lens is often used for taking a picture at little distance from the object, the inner focus may be performed to fix a front lens and prevent an adhesion of contamination or a blemish.

Next, a relationship of an image circle when varying the magnification, a plurality of screen sizes, the first mark 1a and the second marks 2a, 2b, 2c, 2d of the zoom operation ring 2 will be described with reference to FIG. 2.

The fisheye lens of the present invention, as illustrated in FIGS. 2A to 2D, has a focal length range where, for a Full Size image-pickup element 6, the circular fisheye is formed at the shortest focal length and the full-frame fisheye is formed at the longest focal length.

Figure 2A:
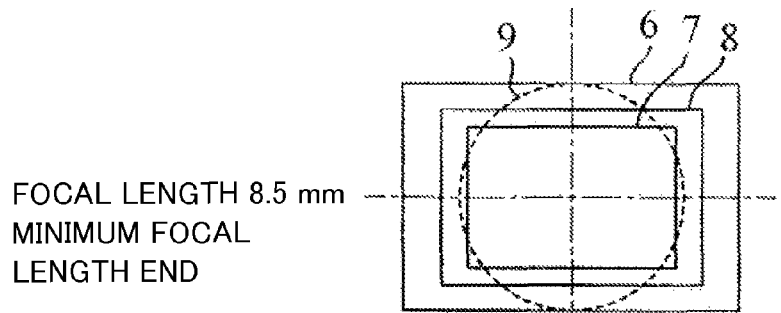
FIGS. 2A to 2D are diagrams illustrating a relationship between an image-pickup element and an image circle of the zoom lens barrel in FIG. 1.

When being mounted on a camera including the Full Size image-pickup element 6, this zoom lens barrel forms an image circle 9 illustrated in FIG. 2A at the focal length 8.5 mm which is the shortest focal length, and functions as a circular fisheye fitting into a narrow side of the Full Size image-pickup element 6. At this time, the first mark 1a of the fixed barrel 1 and the second mark 2a of the zoom operation ring 2 are matched in a circumferential direction of the lens barrel.

Figure 2B:
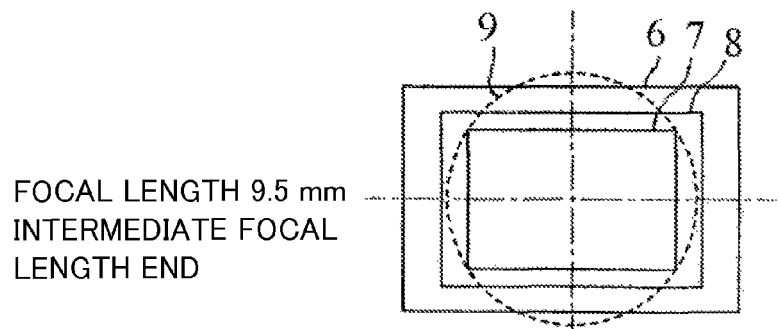

Next, when changing the focal length to 9.5 mm by rotating the zoom operation ring 2, the image circle 9 enlarges by a state in FIG. 2B and functions as the full-frame fisheye for an APS-C size image-pickup element 7. At this time, the first mark 1a of the fixed barrel 1 and the second mark 2b of the zoom operation ring 2 are matched in the circumferential direction of the lens barrel.

Figure 2C:
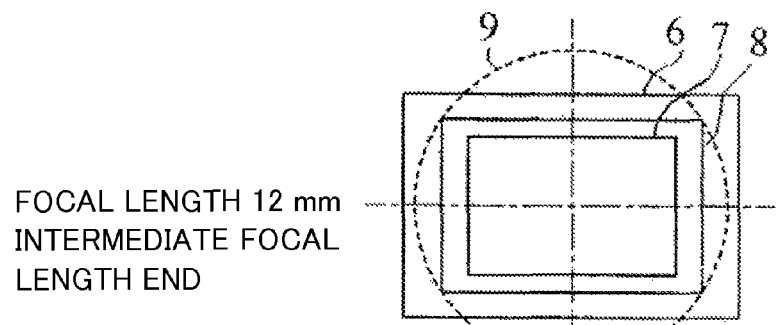

When changing the focal length to 12 mm by further rotating the zoom operation ring 2, the image circle 9 enlarges by a state in FIG. 2C and functions as the full-frame fisheye for an APS-H size image-pickup element 8. At this time, the first mark 1a of the fixed barrel 1 and the second mark 2c of the zoom operation ring 2 are matched in the circumferential direction of the lens barrel.

Figure 2D:
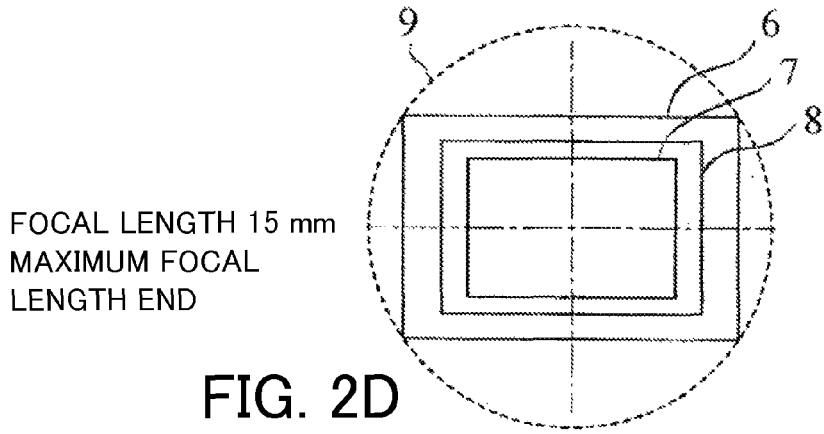

When changing the focal length to 15 mm which is the longest focal length by further rotating the zoom operation ring 2, the image circle 9 enlarges by a state in FIG. 2D and functions as the full-frame fisheye for the Full Size image-pickup element 6. At this time, the first mark 1a of the fixed barrel 1 and the second mark 2d of the zoom operation ring 2 are matched in the circumferential direction of the lens barrel.

The zoom lens barrel in embodiment 1 rotates the zoom operation ring 2 to the shortest focal length, and thereby forming an image circle as the circular fisheye in a camera having the Full Size image pickup element 6. Moreover, the zoom lens barrel rotates the zoom operation ring 2 to the longest focal length, and thereby forming an image circle as the full-frame fisheye in a camera having the Full Size image pickup element 6. Furthermore, when being mounted on a camera having the APS-C size image-pickup element 7, the zoom lens barrel can be configured to a focal length forming the full-frame fisheye by matching the first mark 1a and the second mark 2b. Moreover, when being mounted on a camera having the APS-H size image-pickup element 8, the zoom lens barrel can be configured to a focal length forming the full-frame fisheye by matching the first mark 1a and the second mark 2c.

Accordingly, even when this zoom lens barrel is mounted on cameras which each have different image-pickup element sizes, a user can easily set the focal length so as to form the full-frame fisheye, and the convenience improves.

Embodiment 2

Hereafter, a zoom lens barrel in embodiment 2 of the present invention will be described with reference to FIGS. 3, 4A to 4F.

Figure 3:
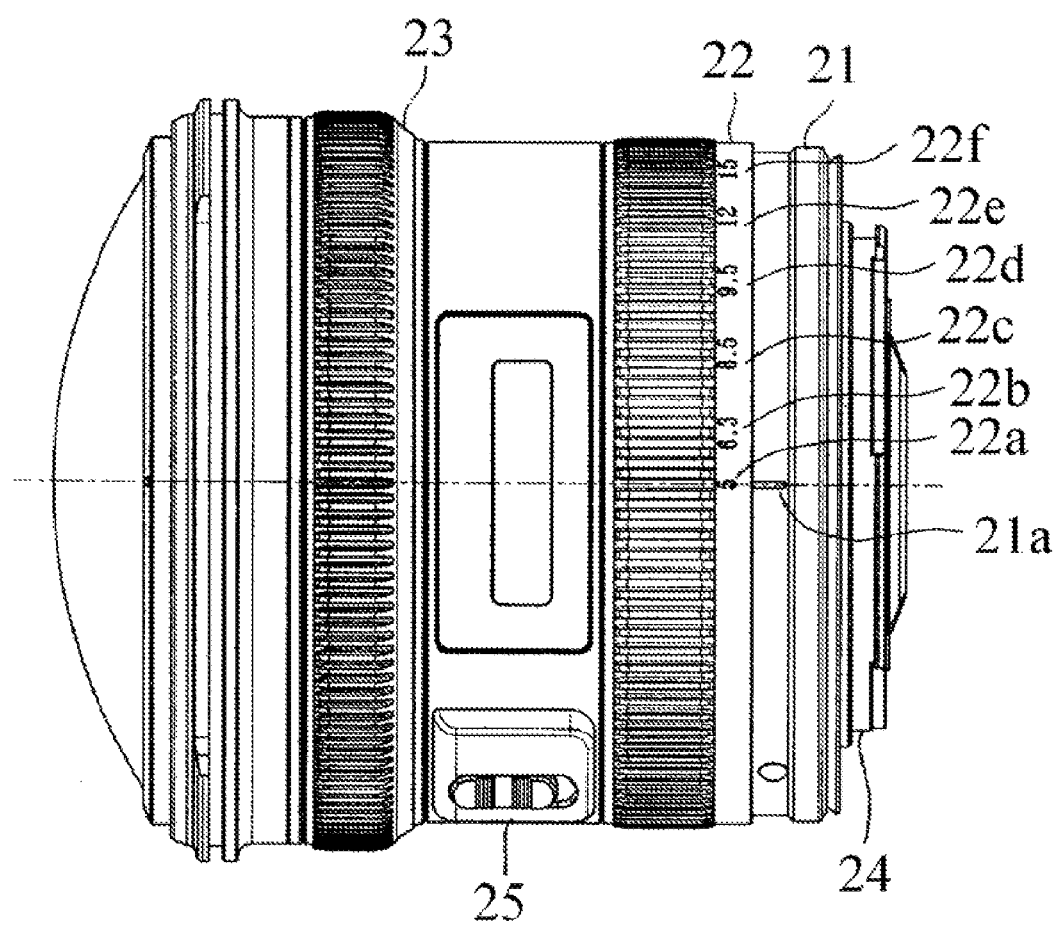
FIG. 3 is an external view of a zoom lens barrel in embodiment 2.

FIG. 3 is an external view of the zoom lens barrel in embodiment 2 in a shortest focal length state.

FIGS. 4A to 4F are diagrams illustrating a relationship between an image-pickup element and an image circle of the zoom lens barrel in embodiment 2.

In addition, since its configuration is the same as embodiment 1, the duplicate descriptions thereof will be omitted.

This zoom lens barrel, as illustrated FIGS. 4A to 4F, has a focal length range where a circular fisheye is formed for a Full Size image pickup element 6 at the shortest focal length and a full-frame fisheye is formed for an APS-C size image-pickup element 7 at a longest focal length.

Figure 4A:
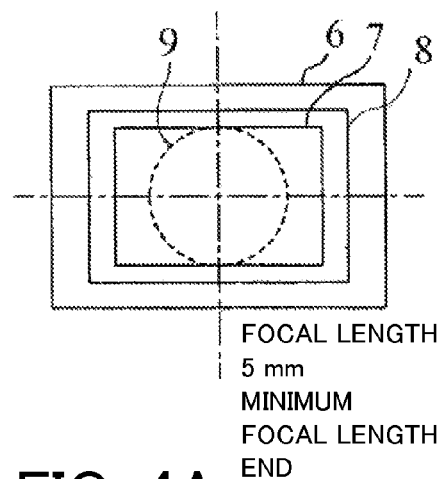
FIGS. 4A to 4F are diagrams illustrating a relationship between an image-pickup element and an image circle of the zoom lens barrel in FIG. 3.

When being mounted on a camera including the APS-C size image-pickup element 7, this zoom lens barrel forms an image circle 9 illustrated in FIG. 4A at the focal length 5 mm which is the shortest focal length, and a circular fish eye fitting into a narrow side of the APC-C size image-pickup element 7 is formed. At this time, the first mark 21a of the fixed barrel 21 and the second mark 22a of the zoom operation ring 22 are matched in a circumferential direction of the lens barrel.

Figure 4B:
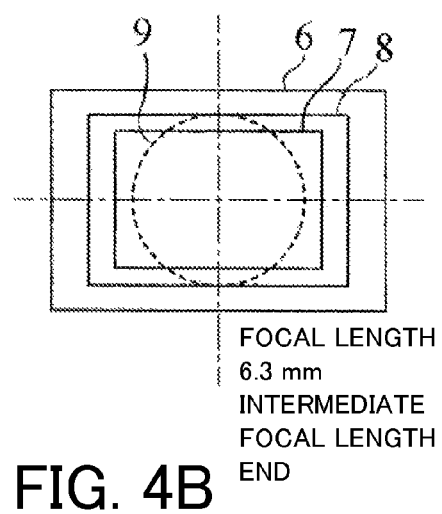

Next, when changing the focal length to 6.3 mm by rotating the zoom operation ring 22, the image circle 9 enlarges by a state in FIG. 4B, and a circular fisheye fitting into a narrow side of an APS-H size image-pickup element 8 is formed. At this time, the first mark 21a of the fixed barrel 21 and the second mark 22b of the zoom operation ring 22 are matched in the circumferential direction of the lens barrel.

Figure 4C:
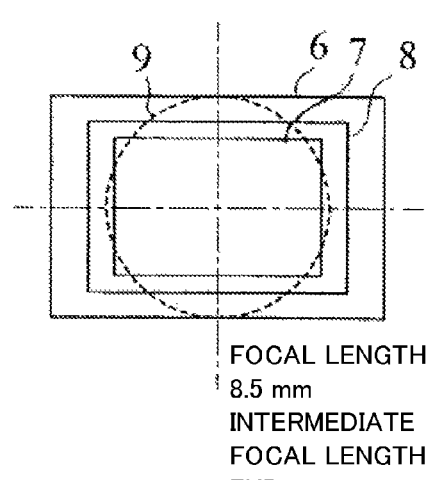

When changing the focal length to 8.5 mm by further rotating the zoom operation ring 22, the image circle 9 enlarges by a state in FIG. 4C, and a circular fisheye fitting into a narrow size of a Full Size image-pickup element 6 is formed. At this time, the first mark 21a of the fixed barrel 21 and the second mark 22c of the zoom operation ring 22 are matched in the circumferential direction of the lens barrel.

Figure 4D:
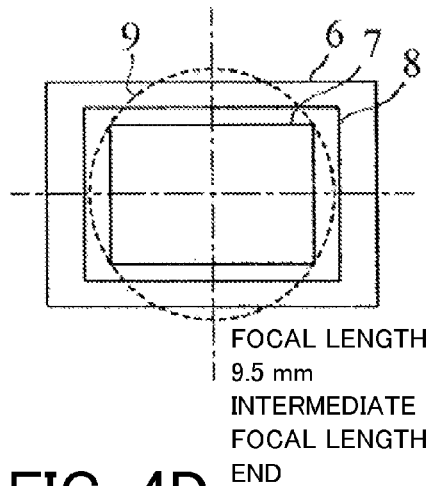

When changing the focal length to 9.5 mm by further rotating the zoom operation ring 22, the image circle 9 enlarges by a state in FIG. 4D, and a full-frame fisheye for the APS-C size image-pickup element 7 is formed. At this time, the first mark 21a of the fixed barrel 21 and the second mark 22d of the zoom operation ring 22 are matched in the circumferential direction of the lens barrel.

Figure 4E:
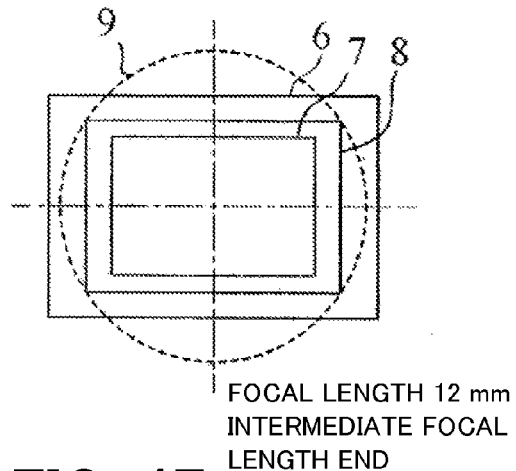

When changing the focal length to 12 mm by further rotating the zoom operation ring 22, the image circle enlarges by a state in FIG. 4E, and a full-frame fisheye for the APS-H size image-pickup element 8 is formed. At this time, the first mark 21a of the fixed barrel 21 and the second mark 22e of the zoom operation ring 22 are matched in the circumferential direction of the lens barrel.

Figure 4F:
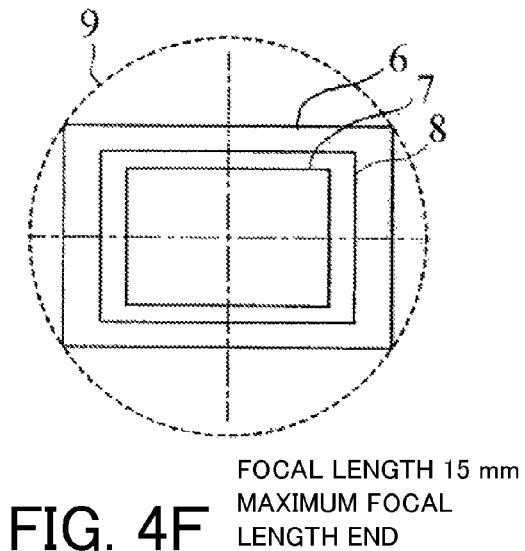

When changing the focal length to 15 mm which is the longest focal length by further rotating the zoom operation ring 22, the image circle 9 enlarges by a state in FIG. 4F and a full-frame fisheye for the Full Size image-pickup element 6 is formed. At this time, the first mark 21a of the fixed barrel 21 and the second mark 22f of the zoom operation ring 22 are matched in the circumferential direction of the lens barrel.

This zoom lens barrel in embodiment 2 can be configured to focal lengths where the zoom lens barrel functions as the circular fisheye and the full-frame fisheye function for each three different image-pickup element size in a focal length range from the shortest focal length to the longest focal length. Therefore, focal lengths forming the full-frame fisheye or the circular fisheye can be set by matching the first mark 21a of the fixed barrel 21 and the second marks 22a, 22b, 22c, 22d, 22e, 22f of the zoom operation ring 22.

Accordingly, even when this zoom lens barrel is mounted on cameras which each have different image-pickup element sizes, a user can easily set the focal length so as to form the full-frame fisheye or the circular fisheye, and the convenience improves.

Embodiment 3

Hereafter, a zoom lens barrel in embodiment 3 of the present invention will be described with reference to FIG. 5.

FIG. 5 is a diagram developing a fixed barrel 31 of the zoom lens barrel and a mark part of a zoom operation ring 32 in a circumferential direction. In addition, since its configuration and a specification of a focal length range are the same as the zoom lens barrel of embodiment 2, the duplicate descriptions thereof will be omitted.

FIG. 5A is an example where second marks 32a-32f of the zoom operation ring 32 are printed using focal length values. In this case, a user needs keep in mind focal lengths configured to form the circular fisheye or the full-frame fisheye in an image-pickup element size of a using camera. The desired focal length can be set by rotating the zoom operation ring 32 in a position matching the first mark 31a of the fixed barrel 31 and the second mark, anyone of 32a-32f, of the zoom operation ring 32 in the circumferential direction, to set a focal length forming a needed angle of view.

FIG. 5B is an example where the second marks 32a-32f of the zoom operation ring 32 are printed using a combination of the focal length values and a focal length value central line 32g. As a result, when a user matches the first mark 31a printed on the fixed barrel 31 and the second mark, any one of 32a-32f, of the zoom operation ring 32, the alignment accuracy can be improved by matching them and the focal length value central line 32g. At this time, the focal length value central line 32g may be not only a line but also a point (circle) mark.

FIG. 5C is an example where the second marks 32a-32f of the zoom operation ring 32 are printed using a combination of a mark representing image-pickup element sizes and a mark representing the circular fisheye or the full-frame fisheye. In this zoom lens barrel, a focal length when the first mark 31a of the fixed barrel 31 and the second mark 32a of the zoom operation ring 32 are matched is 5 mm. In this case, when being mounted on a camera having an APS-C size image-pickup element 7, an image circle 9 in FIG. 4A is formed and the circular fisheye fitting into a narrow side of the APS-C image-pickup element 7 is formed. Therefore, by indicating the second mark 32a of the zoom operation ring 32 as "C·o", a focal length where the circular fisheye focal length is obtained in a camera including the APS-C size image-pickup element 7 can be informed a user.

FIG. 5D is a table representing an indicating example of the second marks 32a-32f of the zoom operation ring 32 depending on the focal lengths in the zoom lens barrel printed by an indication method of FIG. 5C. An indication where those marks are combined makes it possible to easily know that the circular fisheye or the full-frame fisheye is formed in time what positions the zoom operation ring 32 is rotated to in an image-pickup element size of a camera where a user uses, and the convenience improves.

In addition, the first mark 31a of the fixed barrel 31 is not limited to mark lines, and may be for example any one or combination of points, lines, letters or signs. Moreover, the indication method thereof is also not limited to a print, and may be any one or combination of type letter, carving, coloring or adherence of seals. Similarly, the second marks 32a-32f of the zoom operation ring 32 is not limited to embodiment 3, and may be any one or combination of focal length values, points, lines, letters or signs. Moreover, the indication method thereof is also not limited to a print, and may be anyone or combination of type letter, carving, coloring or adherence of seals.

Embodiment 4

Hereafter, a zoom lens barrel in embodiment 4 of the present invention will be described with reference to FIGS. 6, 7A to 7E.

Figure 6:
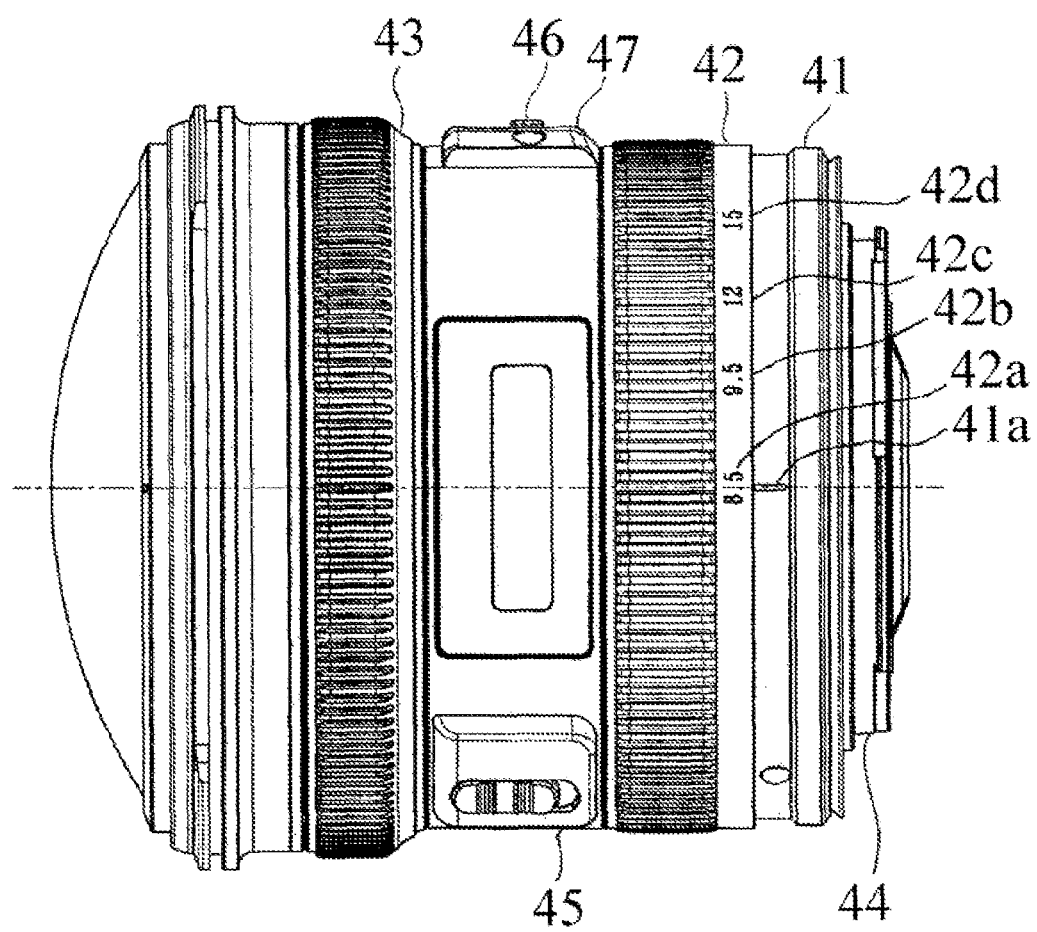
FIG. 6 is an external view of a zoom lens barrel in embodiment 4.

FIG. 6 is an external view of a zoom lens barrel in embodiment 4 of the present invention.

FIGS. 7A to 7E are lateral views of a zoom lens barrel illustrated in FIG. 6.

In FIG. 6, this zoom lens barrel is the same as a zoom lens barrel of embodiment 1, and has a focal length range where, for a Full Size image-pickup element 6, a circular fisheye at a shortest focal length is formed and a full-frame fisheye at a longest focal length is formed. See FIGS. 2A to 2D.

A reference numeral 41 denotes a fixed barrel, and a reference numeral 42 denotes a zoom operation ring rotatably supported on the fixed barrel 41. Due to a rotating operation of the zoom operation ring 42, a magnification lens units L1, L2 illustrated in FIG. 8 move on an optical axis, and the focal length is changed.

The first mark 41a is printed on the fixed barrel 41. Moreover, a focal length value 42a at the shortest focal length, focal length values 42b, 42c in an intermediate focal length, and a focal length value 42d at the longest focal length are printed. These mean the second marks.

A reference numeral 43 denotes a focus operation ring. A reference numeral 44 denotes a mount member, and having a Bayonet shape to mount it on a camera body (not illustrated). A reference numeral 45 denotes a switch member for switching operations of AF and MF. A lock member (lock holding unit) restricting a rotation of the zoom operation ring 42 and a cover member 47 having a long hole 47a are provided on the fixed barrel 41. A tag member 46a of the lock member 46 penetrates the long hole 47a.

In accordance with a control of the tag member 46a in the long hole 47a in an optical axis direction in the vicinity, the lock member 46 moves back and forth between a lock position where a front member projects from a front opening of the cover member 47 and a unlock position where the front member is retracted in the front opening.

On the other hand, notch portions 42e, 42f, 42g, 42h (engagement portion) opening frontward are formed in a circumferential direction of the zoom operation ring 42. In addition, the notch portions 42e, 42f, 42g, 42h in the zoom operation ring 42 are formed in positions set to focal lengths where the circular fisheye or the full-frame fisheye are formed for a predetermined image-pickup element when these positions face to the lock member 46.

Next, a relationship between the notch portions 42e, 42f, 42g, 42h of the zoom operation ring 42 and the lock member 46 will be described with reference to FIGS. 7A to 7E.

Figures 7A, 7D:
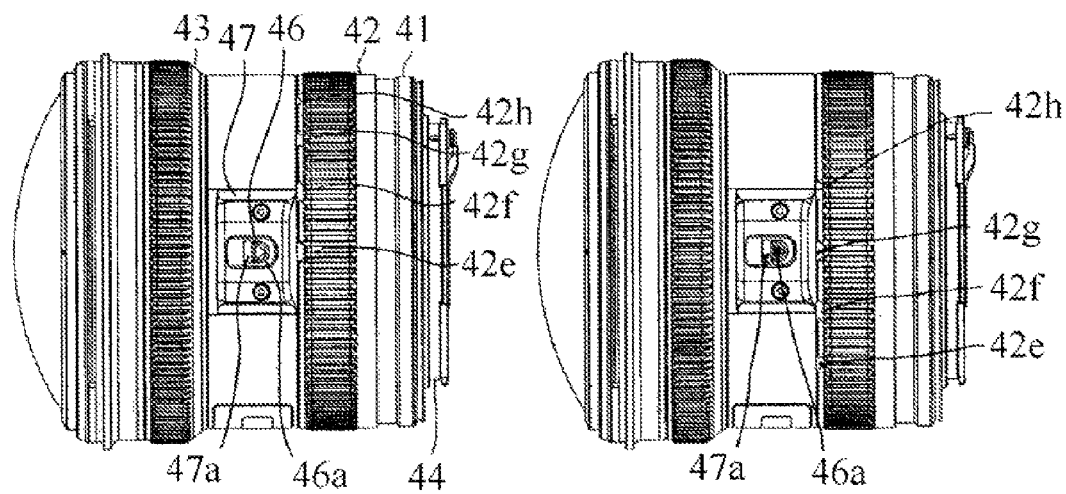
FIGS. 7A to 7E are lateral views of the zoom lens barrel in embodiment 4.

The zoom operation ring 42 is set so that the notch portion 42e faces to the lock member 46, and the lock member 46 is operated to the lock position as illustrated in FIG. 7A, and as a result the front member of the lock member 46 is engaged with the notch portion 42e. This locks the zoom operation ring 42 and restricts a rotation with respect to the fixed barrel 41. At this time, the first mark 41a of the fixed barrel 41 and the focal length value 42a of the zoom operation ring (second mark) are matched in a circumferential direction of the lens barrel. This zoom lens barrel is set at the shortest focal length, and the circular fisheye for the Full Size image-pickup element 6 is formed. See FIG. 2A.

Figures 7B, 7E:
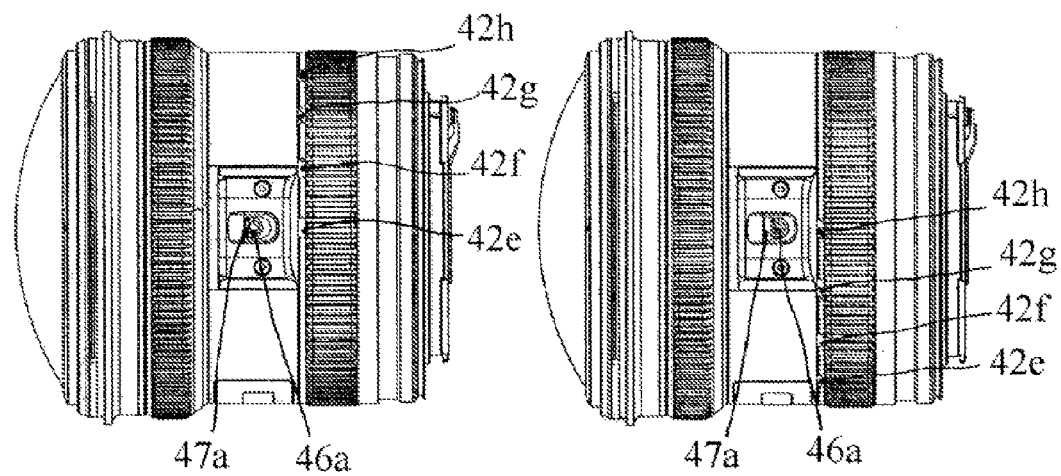

If rotating the zoom operation ring 42, as illustrated in FIG. 7B, by operating the lock member 46 to the unlock position, the engagement between the front member of the lock member 46 and the notch portion 42e are unlocked, and the rotation of the zoom operation ring 42 is allowable.

Figure 7C:
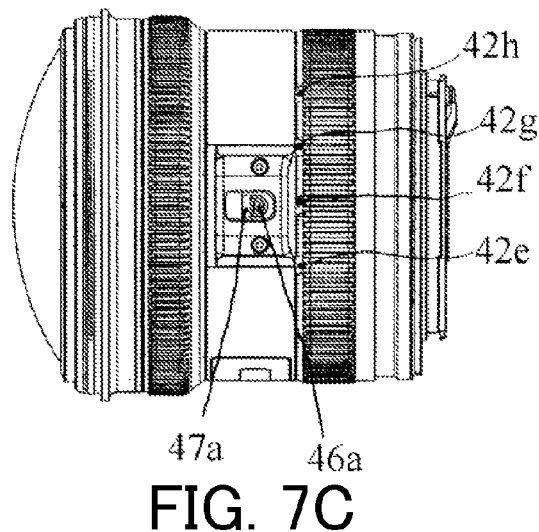

Next, when the zoom operation ring 42 is set by being rotated so that the notch portion 42f faces to the lock member 46 and the lock member 46 is operated to the lock position as illustrated in FIG. 7C, the front member of the lock member 46 is engaged with the notch portion 42f. At this time, the first mark 41a of the fixed barrel 41 and the focal length value 42b of the zoom operation ring (second mark) are matched in the circumferential direction of the lens barrel, and this zoom lens barrel forms the full-frame fisheye for the APS-C size image-pickup element 7. See FIG. 2B.

Similarly, when the zoom operation ring 42 is set by rotating the zoom operation ring 42 so that the notch portion 42g faces to the lock member 46 and the lock member 46 is operated to the lock position as illustrated in FIG. 7D, the front member of the lock member 46 is engaged with the notch portion 42g. At this time, the first mark 41a of the fixed barrel 41 and the focal length value 42c of the zoom operation ring (second mark) are matched in the circumferential direction of the lens barrel, and this zoom lens barrel forms the full-frame fisheye for the APS-H size image-pickup element 8. See FIG. 2C.

Furthermore, when the zoom operation ring 42 is rotated to the longest focal length, the notch portion 42h faces to the lock member 46. Here, when the lock member 46 is operated to the lock position as illustrated FIG. 7E, the front member of the lock member 46 engages the notch portion 42h. At this time, the first mark 41a of the fixed barrel 41 and the focal length value 42d of the zoom operation ring (second mark) are matched in the circumferential direction of the lens barrel, and this zoom lens barrel forms the full-frame fisheye for the Full Size image-pickup element 6. See FIG. 2D.

Embodiment 4 operates the lock member 46 in a state where any one of the second marks 42a, 42b, 42c, 42d printed on the zoom operation ring 42 is matched to the first mark 41a printed on the fixed barrel 41. This operation enables the zoom operation ring to be locked at a focal length position where the circular fisheye or the full-frame fisheye is formed for a predetermined image image-pickup element size. Accordingly, the zoom operation ring is not carelessly rotated from a focal length which a user set, and the angle of view is not varied.

In addition, a configuration of a lock member is not limited to embodiment 4, and the lock member may be configure to, for example, provide a click ball between the fixed barrel 41 and the zoom operation ring 42 to generate a click at a position set to a predetermined focal length.

Next, a concrete embodiment of a lens configuration used for a fisheye zoom lens barrel of this invention will be described below. A reference numeral r denotes a curvature radius, A reference numeral d denotes a lens thickness or a lens interval, A reference numeral r denotes a refractive index of a d line, A reference numeral vd denotes an Abbe number, and A reference numeral BF denotes a back focus value. The lens interval (d value) varying along with a F number, a focal length, an angle of view, a BF and a magnification will be described in order of a shortest focal length (W), a intermediate focal length (M), and a longest focal length (T).

As is commonly known, when a z axis is in the optical axis direction and a y axis is in a direction perpendicular to the optical axis, an aspherical surface used in the following embodiment denotes a curve surface obtained by rotating around the optical axis a curve line represented as the following well-known aspherical surface expression (9):

$$Z=(Y^2/r)/[1+\sqrt{1-(1+K)(Y/r)^2}]+AY^2+BY^4+CY^6+DY^8+ \quad (9)$$

The aspherical surface expression satisfies a shape by providing a paraxial curvature radius: r, a constant of the cone: K, and an spherical surface coefficient of higher order: A, B, C, D. In addition, in a sign of the aspherical surface coefficient of higher order, e followed by numerals represents powers of 10. For example, "e-9" denotes $10^{-9}$.

Hereafter, preferred embodiments of the present invention will be described with reference to drawings.

Embodiment 5

FIG. 8 and Table 1 represent an embodiment of a fisheye zoom lens (optical system) in the present invention. FIG. 8 is a configuration diagram of the fisheye zoom lens.

This fisheye zoom lens system is constituted by a negative first lens unit (L1) and a positive second lens unit (L2) in order from an object side. The first lens unit is constituted by a negative eleventh lens unit (L11) and a negative twelfth lens unit (L12) in order from the object side. The eleventh lens unit is constituted by a first negative meniscus lens which is convex to the object side and a second negative meniscus lens which is convex to the object side, a third negative lens, and a forth positive lens, in order form the object side. The twelfth lens unit is constituted by a fifth negative lens. The second lens unit includes a sub-stop (SS), a sixth positive lens, and an aperture stop (S) in order from the object side. Moreover, it includes a cemented lens of a seventh negative lens and an eighth positive lens, a cemented lens of a ninth positive lens and a tenth negative lens, a eleventh positive lens, a cemented lens of a twelfth negative lens and a thirteenth positive lens, and a fourteenth positive lens, in order from the object side. A reference numeral I denotes an image surface. In embodiment 5, a magnification variation is performed by varying an interval on the optical axis between the first lens unit and the second lens unit. The focusing is performed by moving the twelfth lens unit in the first lens unit in the optical axis direction.

TABLE 1 unit of credit mm surface data

| surface number | r | d | nd | vd | effective diameter |
|---|---|---|---|---|---|
| 1 | 59.840 | 2.50 | 1.80400 | 46.6 | 61.87 |
| 2 | 17.282 | 14.64 | | | 34.15 |
| 3 | 129.723 | 1.61 | 1.59282 | 68.6 | 32.59 |
| 4 | 21.610 | 6.44 | | | 27.39 |
| 5 | −86.935 | 1.36 | 1.59282 | 68.6 | 27.10 |
| 6 | 31.102 | 0.15 | | | 25.84 |
| 7 | 22.525 | 7.45 | 1.80518 | 25.4 | 26.07 |
| 8 | −110.226 | 5.82 | | | 24.72 |
| 9* | −31.089 | 1.20 | 1.85135 | 40.1 | 17.80 |
| 10 | −844.340 | (variable) | | | 17.08 |
| 11 | ∞ | 1.46 | | | 10.26 |
| 12 | 43.413 | 1.62 | 1.88300 | 40.8 | 10.87 |
| 13 | −94.260 | 1.85 | | | 10.94 |
| 14(stop) | ∞ | 1.70 | | | 10.95 |
| 15 | −19.292 | 0.75 | 1.88300 | 40.8 | 10.96 |
| 16 | 32.493 | 3.22 | 1.51823 | 58.9 | 11.53 |
| 17 | −20.261 | 0.20 | | | 12.31 |
| 18 | 194.716 | 4.25 | 1.48749 | 70.2 | 12.74 |
| 19 | −12.377 | 0.80 | 1.88300 | 40.8 | 13.21 |
| 20 | −27.182 | 0.20 | | | 13.96 |
| 21 | 712.893 | 3.28 | 1.59270 | 35.3 | 14.77 |
| 22 | −21.620 | 0.35 | | | 15.87 |
| 23 | −60941.798 | 0.93 | 1.83400 | 37.2 | 16.91 |
| 24 | 28.231 | 4.77 | 1.49700 | 81.5 | 17.60 |
| 25 | −34.279 | 0.20 | | | 18.70 |
| 26 | −80910.795 | 1.68 | 1.48749 | 70.2 | 19.49 |
| 27 | −87.072 | (variable) | | | 19.87 |
| image surface | ∞ | | | | |

ASPHERIC SURFACE DATA
NINTH SURFACE

K = 0.00000e+000 A 4 = −6.64162e−006 A 6 = 2.58871e−008
A 8 = −8.99837e−010 A10 = 1.12233e−011 A12 = −5.07106e−014

VARIOUS TYPES OF DATA

| | short focus | middle | long focus |
|---|---|---|---|
| focal length | 8.05 | 11.85 | 15.14 |
| F number | 4.12 | 4.12 | 4.12 |
| angle of view | 175 | 175 | 175 |
| image height | 11.15 | 16.77 | 21.64 |
| overall length of lens | 129.57 | 127.26 | 129.98 |
| BF | 40.25 | 49.58 | 57.66 |
| d10 | 20.89 | 9.25 | 3.89 |
| d27 | 40.25 | 49.58 | 57.66 |

ZOOM LENS UNIT DATA

| unit | Start surface | Focal length | Lens configuration length | Front principal point position | Rear principal point position |
|---|---|---|---|---|---|

TABLE 1-continued unit of credit mm

| | | | | | |
|---|---|---|---|---|---|
| 1 | 1 | −10.91 | 41.17 | 10.51 | −15.41 |
| 2 | 11 | 26.80 | 27.26 | 15.90 | −6.32 |

Embodiment 6

Figure 9:
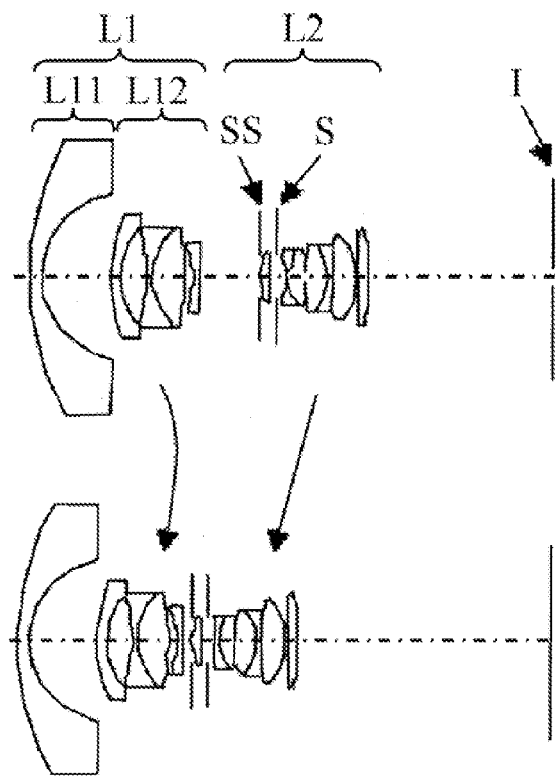
FIG. 9 is a diagram illustrating a lens configuration at a shortest focal length and a longest focal length in a zoom lens barrel in embodiment 6 and a trajectory of the lens configuration.

FIG. 9 and Table 2 represent another embodiment of a fisheye zoom lens in the present invention. FIG. 9 is a configuration diagram of the fisheye zoom lens.

This fisheye zoom lens system is constituted by a negative first lens unit (L1) and a positive second lens unit (L2) in order from an object side. The first lens unit is constituted by a negative eleventh lens unit (L11) and a negative twelfth lens unit (L12) The negative eleventh lens unit (L11) and the negative twelfth lens unit (L12) are arranged in increasing order of distance from the object side. The eleventh lens unit is constituted by a first negative meniscus lens with is convex to the object side in order from the object side. The twelfth lens unit is constituted by a second negative meniscus lens which is convex to the object side, a third negative lens, a forth positive lens, and a fifth negative lens in order from the object side. The second lens unit is constituted by a subs stop (SS), a sixth positive lens, an aperture stop (S), a cemented lens of a seventh negative lens and an eighth positive lens, a cemented lens of a ninth positive lens and a tenth negative lens, a eleventh positive lens, and a twelfth positive lens. A reference numeral I denotes an image surface. In embodiment 6, the magnification variation is performed by varying an interval between the first lens unit and the second lens unit on the optical axis. The focusing is performed by moving the twelfth lens unit of the first lens unit in the optical axis direction.

TABLE 2 unit of credit mm surface data

| surface number | r | d | nd | vd | effective diameter |
|---|---|---|---|---|---|
| 1 | 62.000 | 2.60 | 1.80400 | 46.6 | 58.33 |
| 2 | 18.100 | 15.41 | | | 34.44 |
| 3 | 38.618 | 1.80 | 1.80400 | 46.6 | 25.02 |
| 4 | 14.968 | 5.55 | | | 20.35 |
| 5 | −38.773 | 1.36 | 1.49700 | 81.5 | 20.15 |
| 6 | 13.721 | 7.00 | 1.80610 | 33.3 | 18.10 |
| 7 | −41.538 | 1.68 | | | 16.58 |
| 8 | −21.935 | 1.32 | 1.88300 | 40.8 | 13.99 |
| 9 | 1151.046 | (variable) | | | 13.17 |
| 10 | ∞ | 0.30 | | | 9.50 |
| 11 | 20.995 | 2.00 | 1.67270 | 32.1 | 9.85 |
| 12 | −147.709 | 1.00 | | | 9.90 |
| 13(stop) | ∞ | 2.00 | | | 9.91 |
| 14 | −32.712 | 0.93 | 1.88300 | 40.8 | 9.93 |
| 15 | 12.947 | 3.12 | 1.59270 | 35.3 | 10.29 |
| 16 | −71.723 | 0.28 | | | 10.94 |
| 17 | 31.397 | 4.60 | 1.48749 | 70.2 | 11.42 |
| 18 | −10.807 | 1.18 | 1.80610 | 33.3 | 11.84 |
| 19 | −120.666 | 0.22 | | | 13.82 |
| 20 | 103.273 | 5.01 | 1.49700 | 81.5 | 15.08 |
| 21 | −14.923 | 0.33 | | | 17.00 |
| 22* | 86.516 | 2.46 | 1.58313 | 59.4 | 19.39 |
| 23 | −49.317 | (variable) | | | 19.84 |
| image surface | ∞ | | | | |

ASPHERICAL SURFACE DATA
TWENTY SECOND SURFACE

TABLE 2-continued unit of credit mm

K = 0.00000e+000 A 4 = −1.79213e−005 A 6 = −2.20392e−008
A 8 = 4.39447e−012 A10 = −4.83129e−013

VARIOUS TYPES OF DATA

| | short focus | middle | long focus |
|---|---|---|---|
| focal length | 8.60 | 11.44 | 15.01 |
| F number | 4.05 | 4.05 | 4.05 |
| angle of view | 175 | 175 | 175 |
| image height | 12.00 | 15.98 | 21.64 |
| overall length of lens | 113.33 | 114.11 | 118.57 |
| BF | 39.99 | 47.23 | 56.34 |
| d 9 | 13.19 | 6.74 | 2.09 |
| d23 | 39.99 | 47.23 | 56.34 |

ZOOM LENS UNIT DATA

| unit | Start surface | Focal length | Lens configuration length | Front principal point position | Rear principal point position |
|---|---|---|---|---|---|
| 1 | 1 | −9.36 | 36.71 | 11.07 | −12.23 |
| 2 | 10 | 23.88 | 23.43 | 15.10 | −5.82 |

Embodiment 7

Figure 10:
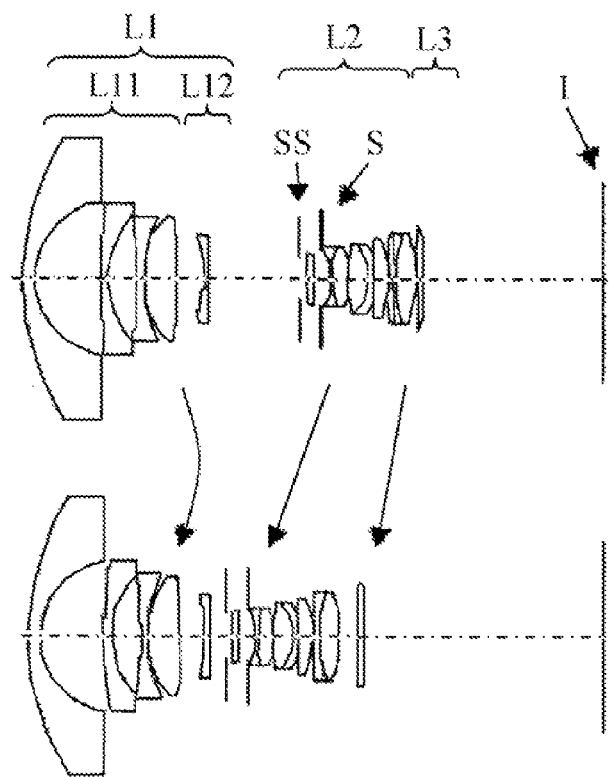
FIG. 10 is a diagram illustrating a lens configuration at a shortest focal length and a longest focal length in a zoom lens barrel in embodiment 7 and a trajectory of the lens configuration.

FIG. 10 and Table 3 represent another embodiment of a fisheye zoom lens in the present invention. FIG. 10 is a configuration diagram of the fisheye zoom lens. Table 3 is the numeric value data. This fisheye zoom lens system is constituted by a negative first lens unit (L1), a positive second lens unit (L2), and a positive third lens unit (L3) in order from an object side. The first lens unit is constituted by a negative eleventh lens unit (L11) and a negative twelfth lens unit (L12) in order from the object side. The eleventh lens unit is constituted by a first negative meniscus lens which is convex to the object side, a second negative meniscus lens which is convex to the object side, a third negative lens, and a fourth positive lens in order from the object side. The twelfth lens unit is constituted by a fifth negative lens. The second lens unit is a sub-stop (SS), a sixth positive lens, an aperture stop (S), a cemented lens of a seventh negative lens and an eighth positive lens, a cemented lens of a ninth positive lens and a tenth negative lens, an eleventh positive lens, and a cemented lens of a twelfth negative lens and a thirteenth positive lens. The third lens unit is constituted by a fourteenth positive lens. A reference numeral I denotes an image surface. In embodiment 7, a magnification variation is performed by changing an interval of the first lens unit, the second lens unit and the third lens unit on an optical axis. The focusing is performed by moving the twelfth lens unit in the first lens unit in the optical axis direction.

TABLE 3 unit of credit mm surface data

| surface number | r | d | nd | vd | effective diameter |
|---|---|---|---|---|---|
| 1 | 60.000 | 2.50 | 1.80400 | 46.6 | 61.58 |
| 2 | 17.284 | 14.71 | | | 34.10 |
| 3 | 147.251 | 1.61 | 1.59282 | 68.6 | 32.39 |
| 4 | 21.509 | 6.37 | | | 27.22 |

TABLE 3-continued unit of credit mm

| | | | | | |
|---|---|---|---|---|---|
| 5 | −88.560 | 1.36 | 1.59282 | 68.6 | 26.95 |
| 6 | 31.212 | 0.15 | | | 25.77 |
| 7 | 22.742 | 7.41 | 1.80518 | 25.4 | 26.02 |
| 8 | −99.973 | 5.82 | | | 24.74 |
| 9* | −31.998 | 1.20 | 1.85135 | 40.1 | 17.86 |
| 10 | −900.000 | (variable) | | | 17.10 |
| 11 | ∞ | 1.46 | | | 10.01 |
| 12 | 45.129 | 1.59 | 1.88300 | 40.8 | 10.60 |
| 13 | −92.908 | 1.85 | | | 10.67 |
| 14(stop) | ∞ | 1.70 | | | 10.70 |
| 15 | −18.989 | 0.75 | 1.88300 | 40.8 | 10.71 |
| 16 | 31.482 | 3.60 | 1.51823 | 58.9 | 11.28 |
| 17 | −19.695 | 0.20 | | | 12.23 |
| 18 | 205.131 | 4.29 | 1.48749 | 70.2 | 12.66 |
| 19 | −12.187 | 0.80 | 1.88300 | 40.8 | 13.14 |
| 20 | −26.863 | 0.20 | | | 13.91 |
| 21 | 490.055 | 3.30 | 1.59270 | 35.3 | 15.26 |
| 22 | −21.668 | 0.35 | | | 16.32 |
| 23 | ∞ | 0.93 | 1.83400 | 37.2 | 17.38 |
| 24 | 28.200 | 4.77 | 1.49700 | 81.5 | 18.09 |
| 25 | −31.469 | (variable) | | | 19.05 |
| 26 | ∞ | 1.49 | 1.48749 | 70.2 | 21.86 |
| 27 | −111.396 | (variable) | | | 22.16 |
| image surface | ∞ | | | | |

ASPHERIC SURFACE DATA
NINTH SURFACE

K = 0.00000e+000 A 4 = −4.97134e−006 A 6 = −6.72678e−009
A 8 = −4.90505e−010 A10 = 9.41652e−012 A12 = −5.79006e−014

VARIOUS TYPES OF DATA

| | short focus | middle | long focus |
|---|---|---|---|
| focal length | 8.05 | 11.84 | 15.07 |
| F number | 4.12 | 4.12 | 4.12 |
| angle of view | 175 | 175 | 175 |
| image height | 11.15 | 16.77 | 21.64 |
| overall length of lens | 129.07 | 127.15 | 130.22 |
| BF | 40.25 | 47.75 | 54.25 |
| d10 | 20.21 | 8.60 | 3.30 |
| d25 | 0.19 | 2.37 | 4.25 |
| d27 | 40.25 | 47.75 | 54.25 |

ZOOM LENS UNIT DATA

| unit | Start surface | Focal length | Lens configuration length | Front principal point position | Rear principal point position |
|---|---|---|---|---|---|
| 1 | 1 | −11.13 | 41.14 | 10.33 | −15.81 |
| 2 | 11 | 29.36 | 25.79 | 15.67 | −5.08 |
| 3 | 26 | 228.51 | 1.49 | 1.00 | 0.00 |

Table 4 represents values in embodiments 5-7 in each condition expression.

TABLE 4

| | (1) | (2) | (3) | (4) |
|---|---|---|---|---|
| Embodiment 5 | 1.94 | 3.69 | 0.55 | 1.804 |
| Embodiment 6 | 1.80 | 4.27 | 0.55 | 1.804 |
| Embodiment 7 | 1.94 | 3.62 | 0.55 | 1.804 |

| | (5) | (6) | (7) | (8) |
|---|---|---|---|---|
| Embodiment 5 | 0.019 | 0.028 | 0.650 | 0.407 |
| Embodiment 6 | 0.028 | 0.028 | 0.685 | 0.392 |
| Embodiment 7 | 0.019 | 0.028 | 0.615 | 0.379 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-159313, filed on Jul. 14, 2010, which is hereby incorporated by reference herein in its entirety.

What is claimed is:

1. A zoom lens barrel comprising:
a fisheye zoom lens optical system;
a fixed barrel with a first mark; and
a zoom operation ring with a second mark corresponding to a focal length of the fisheye zoom lens optical system, the zoom operation ring being supported on the fixed barrel and configured to change the focal length of the fisheye zoom lens optical system,
wherein a focal length where the first mark and the second mark are matched to each other is a focal length that provides an angle of view for a circular fisheye or a focal length that provides an angle of view for a full-frame fisheye for at least one image-pickup element size.

2. The zoom lens barrel according to claim 1, wherein the zoom lens barrel is configured to be interchangeably mounted on cameras having different image-pickup element sizes.

3. The zoom lens barrel according to claim 1, wherein a focal length region of the fisheye zoom lens optical system contains at least the focal length that provides the angle of view for the circular fisheye and the focal length that provides the angle of view for the full-frame fisheye for the at least one image-pickup element size.

4. The zoom lens barrel according to claim 1, wherein there are a plurality of second marks each corresponding to a different focal length.

5. The zoom lens barrel according to claim 4, wherein:
the zoom lens barrel is configured to be interchangeably mounted on cameras having different image-pickup element sizes, and different focal lengths corresponding to the plurality of second marks provide angles of view for the circular fisheye and for the full-frame fisheye for the at least one image-pickup element side among the different image-pickup element sizes, and
each of the plurality of second marks contains information of a corresponding one of the different image-pickup element sizes, and information of the angle of view for the circular fisheye or the angle of view for the full-frame fisheye for the corresponding one.

6. The zoom lens barrel according to claim 5, wherein the plurality of second marks contain information of the angle of view for the circular fisheye and information of the angle of view for the full-frame fisheye for each of the different image-pickup element sizes.

7. The zoom lens barrel according to claim 1, wherein the focal length where the first mark and the second mark are matched to each other is the focal length that provides the angle of view for the circular fisheye in which an image circle is inscribed in an image-pickup element having a predetermined size.

8. The zoom lens barrel according to claim 1, wherein the focal length where the first mark and the second mark are matched to each other is the focal length that provides the angle of view for the full-frame fisheye in which an image circle is circumscribed about an image-pickup element having a predetermined size.

9. A zoom lens barrel comprising:
a fisheye zoom lens optical system;
a fixed barrel;

a zoom operation ring supported on the fixed barrel and configured to change a focal length of the fisheye zoom lens optical system; and a lock holding unit configured to hold the zoom operation ring for the fixed barrel, wherein the zoom operation ring includes an engagement portion for engaging with the lock holding unit, and wherein a lock position for the fixed barrel of the zoom operation ring is a focal length that provides an angle of view of a circular fisheye or a focal length that provides an angle of view for a full-frame fisheye for at least one image-pickup element size.

10. The zoom lens barrel according to claim 9, wherein:

the fixed barrel is provided with a first mark, the zoom operation ring is provided with a second mark corresponding to a focal length of the fisheye zoom lens optical system, and a focal length where the first mark and the second mark are matched to each other is the focal length that provides the angle of view for the circular fisheye or the focal length that provides the angle of view for the full-frame fisheye for the at least one image-pickup element size.

11. The zoom lens barrel according to claim 10, wherein the zoom lens barrel is configured to be interchangeably mounted on cameras having different image-pickup element sizes.

12. The zoom lens barrel according to claim 10, wherein there are a plurality of second marks each corresponding to a different focal length.

13. The zoom lens barrel according to claim 12, wherein:

the zoom lens barrel is configured to be interchangeably mounted on cameras having different image-pickup element sizes, and different focal lengths corresponding to the plurality of second marks provide angles of view for the circular fisheye and for the full-frame fisheye for the at least one image-pickup element side among the different image-pickup element sizes, and each of the plurality of second marks contains information of a corresponding one of the different image-pickup element sizes, and information of the angle of view for the circular fisheye or the angle of view for the full-frame fisheye for the corresponding one.

14. The zoom lens barrel according to claim 13, wherein the plurality of second marks contain information of the angle of view for the circular fisheye and information of the angle of view for the full-frame fisheye for each of the different image-pickup element sizes.

15. The zoom lens barrel according to claim 9, wherein a focal length region of the fisheye zoom lens optical system contains at least the focal length that provides the angle of view for the circular fisheye and the focal length that provides the angle of view for the full-frame fisheye for the at least one image-pickup element size.

16. The zoom lens barrel according to claim 9, wherein the focal length where the first mark and the second mark are matched to each other is the focal length that provides the angle of view for the circular fisheye in which an image circle is inscribed in an image-pickup element having a predetermined size.

17. The zoom lens barrel according to claim 9, wherein the focal length where the first mark and the second mark are matched to each other is the focal length that provides the angle of view for the full-frame fisheye in which an image circle is circumscribed about an image-pickup element having a predetermined size.

* * * * *